United States Patent [19]

Nara et al.

[11] Patent Number: 4,814,591
[45] Date of Patent: Mar. 21, 1989

[54] PORTABLE MEDIUM

[75] Inventors: Seietsu Nara; Tomoko Yamauchi, both of Yokohama, Japan

[73] Assignee: Kabushiki Kaisha Toshiba, Kawasaki, Japan

[21] Appl. No.: 175,404

[22] Filed: Mar. 30, 1988

[30] Foreign Application Priority Data

Apr. 13, 1987 [JP] Japan .................................. 62-90109
Oct. 26, 1987 [JP] Japan ................................ 62-269717
Oct. 26, 1987 [JP] Japan ................................ 62-269718

[51] Int. Cl.⁴ ............................................. G06K 5/10
[52] U.S. Cl. ..................................... 235/380; 235/379
[58] Field of Search ................................ 235/379, 380

[56] References Cited

U.S. PATENT DOCUMENTS 4,529,780 7/1985 Chaum ................................. 235/379
4,697,072 9/1987 Kawana ............................... 235/380

Primary Examiner—Harold I. Pitts
Attorney, Agent, or Firm—Cushman, Darby & Cushman

[57] ABSTRACT

An IC card, i.e., a portable medium, contains a data memory and a CPU functioning as a control element. The IC card has a keyboard and a built-in battery. It also includes a clock controller, a first clock generator always generating a low-frequency clock signal, and a second clock generator having a oscillator, for generating a high-frequency clock signal. When the IC card is used in an off-line mode, that is, when it is used by itself, it is driven by the battery. The CPU performs various operations in accordance with the signals input by operating the keyboard. When the power-on key of the keyboard is pushed in the off-line mode, the clock controller supplies the low-frequency clock signal to the CPU, and simultaneously causes the second clock generator to generate the high-frequency clock signal. When the next signal is input from the keyboard, the clock controller supplies the high-frequency clock signal, instead of the low-frequency clock signal, to the CPU.

21 Claims, 11 Drawing Sheets

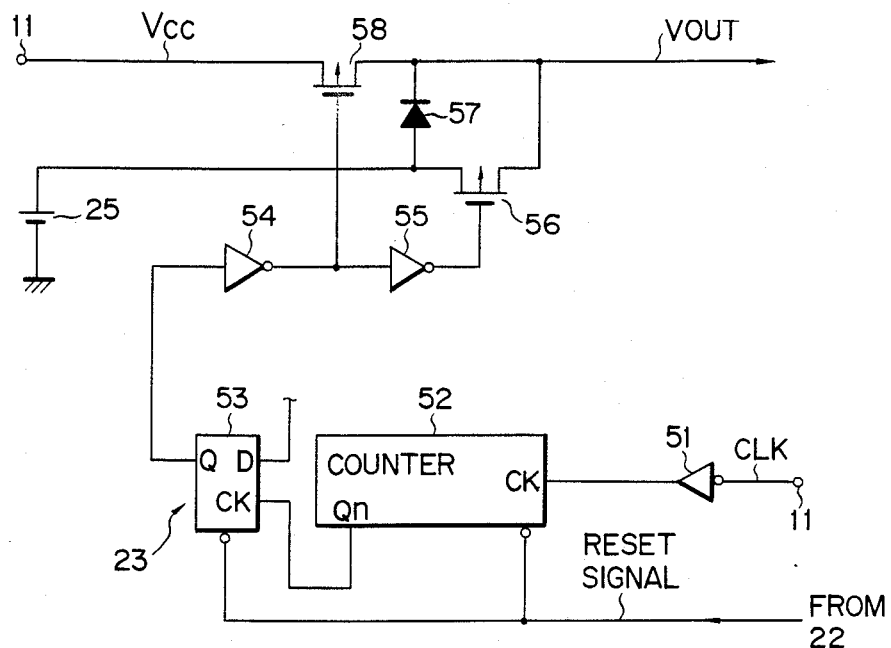
F I G. 4
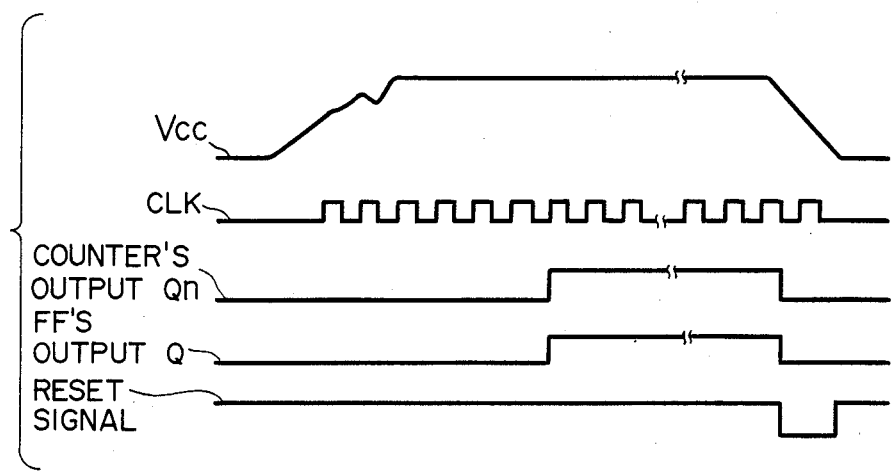
F I G. 5

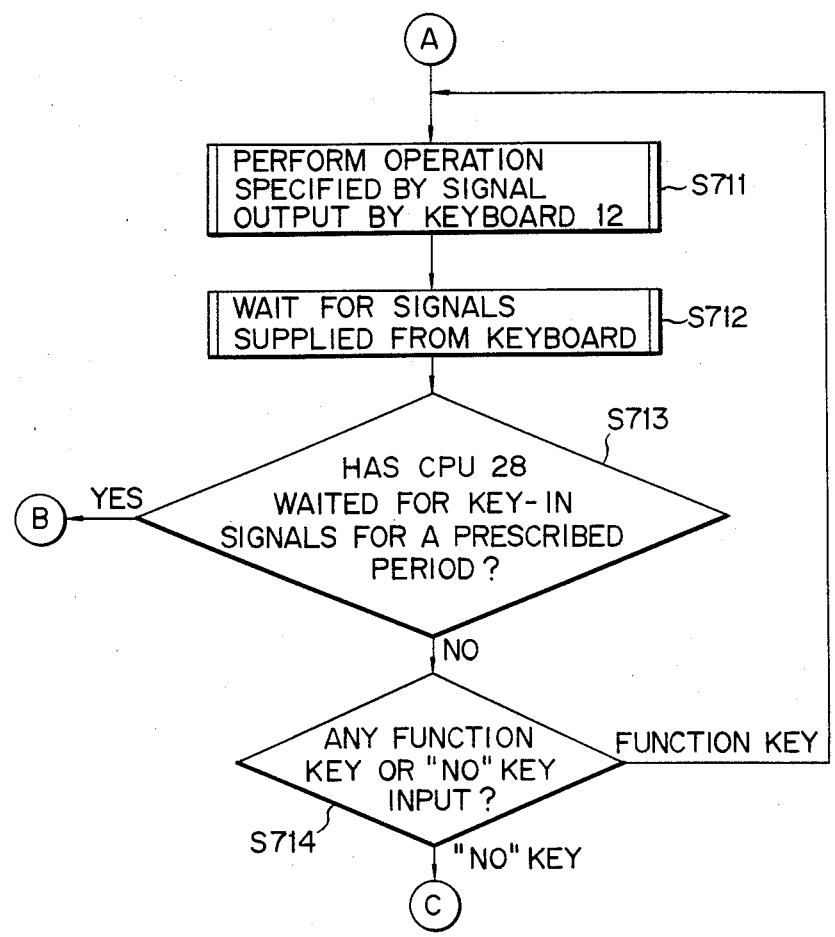
F I G. 7B

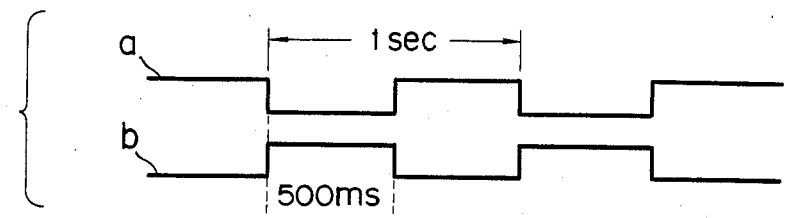
F I G. 9
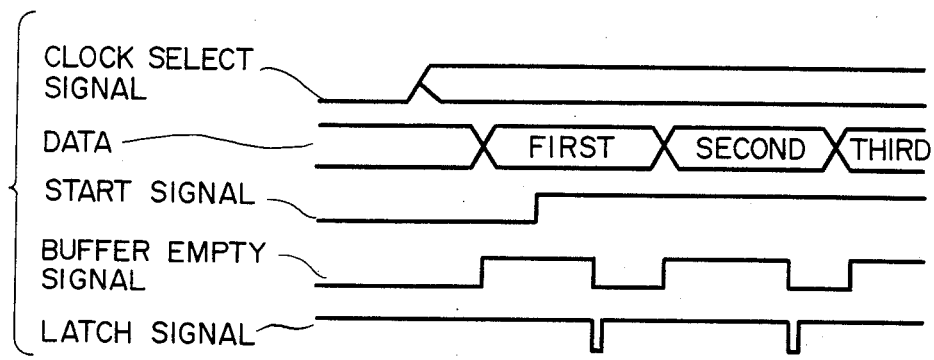
F I G. 11
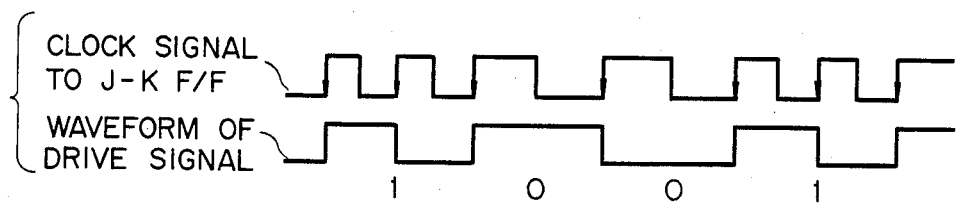
F I G. 12

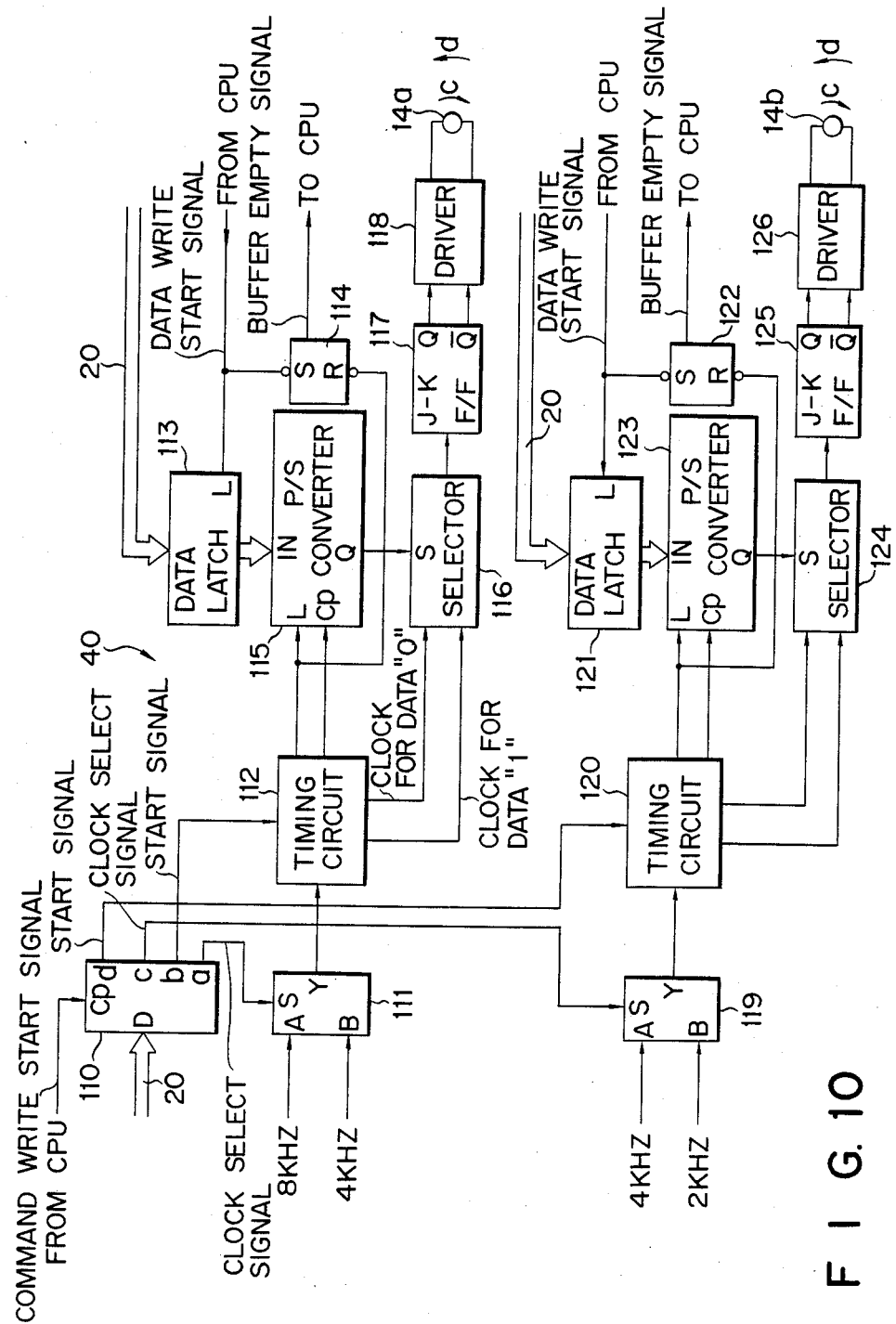
F I G. 10

PORTABLE MEDIUM

BACKGROUND OF THE INVENTION

1. Field of the Invention

This invention relates to a portable medium such as a multifuctional integrated circuit (IC) card incorporating a central processor unit (CPU), a data memory, a battery and so on, which is used for calculation and timekeeping, and adapted for use with terminals.

2. Description of the Related Art

Recently, multifuctional IC cards have been developed which incorporate a CPU, a data memory, a battery and so on. The IC card itself serves as a hand-held calculator or timepiece with the aid of a keyboard and display device mounted on the top thereof. Such an IC card is disclosed in U.S. Pat. No. 4,697,072 (kawana), for instance. However, it does not mention the prevention of a built-in battery of the card from being excessively consumed.

Where the IC card is used along, or used in off-line operations, data processing is performed by the use of a built-in battery. To decrease power dissipation, therefore, low frequency clocks (low speed clocks) are used for CPU clocks.

However, since the low frequency clocks result in low processing speed, high frequency clocks (high speed clocks) are sometimes used to perform the data processing faster. Where the high frequency clocks are used, the power dissipation increases in the CPU so that the life of the battery will decrease.

SUMMARY OF THE INVENTION

It is an object of this invention to provide a portable medium capable of attaining high processing speed during off-line operations, decreasing overall power dissipation, and increasing the life of a built-in battery.

A portable medium according to this invention comprises a control element which controls a data memory, input means for inputting various instructions for causing the control element to perform various operations, first clock means for generating a clock signal of a first frequency, second clock means for generating a clock signal of a second frequency which is higher than that of the first frequency, and clock control means for causing the second clock means to start generating the clock signal, in response to an instruction supplied from the input means for starting the control element, for supplying the clock signal of the first frequency generated by the first clock means to the control element, and, when the next instruction is supplied from the input means, for supplying the clock signal of the second frequency generated by the second clock means to the control element.

BRIEF DESCRIPTION OF THE DRAWINGS

The embodiments of this invention will now be described by way of examples and with reference to the accompanying drawings, in which:

FIG. 4 shows an arrangement of the power controller of FIG. 3;

FIG. 5 is a timing chart useful for explaining the operation of the power controller of FIG. 4;

FIGS. 7A and 7B show flowcharts for explaining the off-line operation of IC card;

FIG. 9 shows a timing diagram of output signals of the frequency divider of FIG. 8;

FIG. 10 shows an arrangement of the magnetism generating member controller of FIG. 4;

FIGS. 11 and 12 show timing diagrams for explaining the operation of the controller of FIG. 10;

DETAILED DESCRIPTION OF THE PREFERRED EMBODIMENTS

Figure 1:
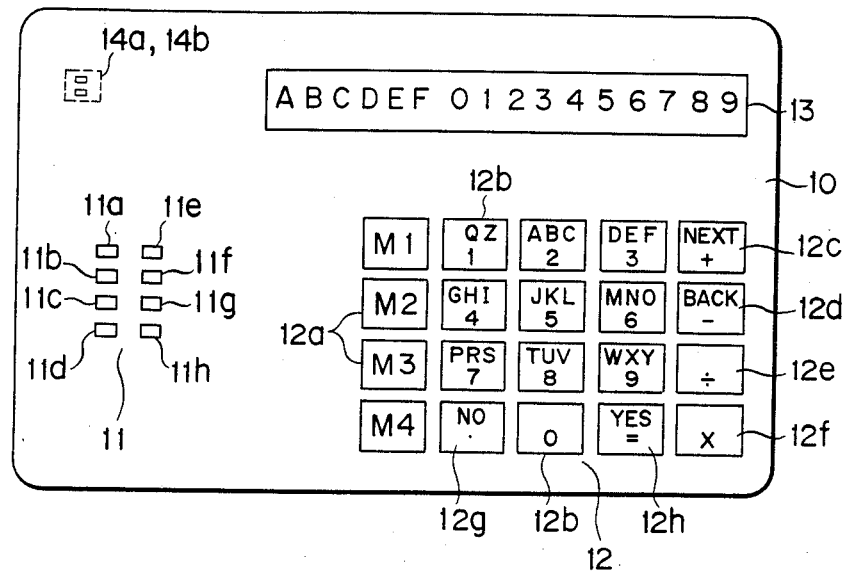
FIG. 1 is a plan view of a IC card as a portable medium according to this invention.

Referring now to FIG. 1, reference numeral 10 generally indicates a smart card, or IC card regarded as a portable medium and having various functions. For example, IC card 10 has an on-line function in which it is used along with a terminal, described later, an off-line function in which it is used alone, and an await condition in which only timekeeping is performed.

The off-line function involves a hand-held calculator mode in which the card is used as a hand-held calculator; a time display mode for displaying the present time; a time correcting mode for correcting the time provided by the timekeeping function; an electronic pocketbook mode for recording and reading addresses, names, telephone numbers and so on; and a purchase mode in which the card is used as a credit card or a cash card. For the off-line function the card is used by itself.

For the purchase mode, IC card 10 stores the cash balance, the expiration date, and the records of purchases. Each time a purchase is made, an amount of money spent on the purchase is subtracted from the balance, and the purchase information is recorded in the IC card 10. When the money balance of the card runs out, or the validity date of the card expired, the card may be renewed by the contract bank, which issues a new secret code.

On the top of IC card 10 are disposed a contact section (connection means) 11 located at a position to meet standard of the card, and a keyboard section (input means) 12 having 20 keys as shown. Further, IC card 10 comprises a display section (display means) 13 located over keyboard section 12 and formed of a liquid crystal display device, and magnetism generating members 14a and 14b as shown.

Contact section 11 is composed of a plurality of contacts or terminals 11a~11h. Specifically, contact 11a is adapted for connecting to an operation power supply voltage Vcc (+5V), contact 11b for connecting to a ground, contact 11c for a clock signal, contact 11d for a reset signal, and contacts 11e~11h for input/output data.

Keyboard section 12 comprises mode keys (M1, M2, M3, M4) 12a for designating the processing modes, ten keys 12b, and arithmetic function keys. The function keys include an addition (+) key 12c, a subtraction (−)

key 12d, a division (÷) key 12e, a multiplication (×) key 12f, a decimal (.) key 12g, and an equal (=) key 12h.

Mode keys 12a are depressed to select an operation which corresponds to hand-held calculator mode (M1), time display mode (M2), electronic pocketbook mode (M13), or purchase mode (M4), using a terminal corresponding to a magnetic stripe. In the case of the purchase mode, a combination of an M4 key and ten keys 12b selects the type of processing which corresponds to the type of card being used, namely a credit card or cash card.

Addition key 12c is also used as the NEXT key which advances the display state of display section 13 to the next state, and subtraction key 12d is also used as the BACK key which returns the display state back to its previous state. Multiplication key 12f is also used as the START key. Decimal key 12g is also used as the NO key and the END key, and as well, equal key 12h is used as the YES key and the POWER-ON key.

Display section 13 is arranged to display 16 digits, each being formed of a 5×7 dot matrix. Magnetism generating members 14a and 14b are properly embedded in IC card 10 to be in alignment with the tracks of a magnetic card reader (magnetic head).

Figure 2:
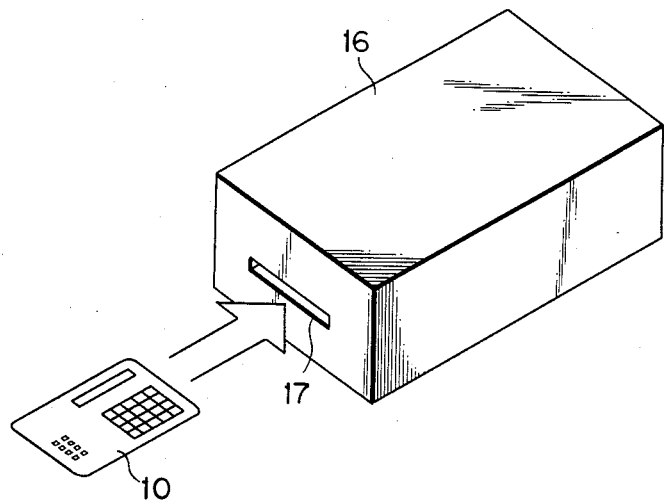
FIG. 2 shows a terminal which handles the IC card of FIG. 1.

FIG. 2 shows an IC-card handling terminal or IC card read/write unit 16 which may be used with, for example, a personal computer. By the connection of IC card 10 inserted into slot 17 to contact section 11, IC card read/write unit 16 is thereby allowed to read data out of a memory in IC card 10, or writes data into the memory. IC card read/write unit 16 is connected by a cable to the personal computer (not shown).

Figure 3:
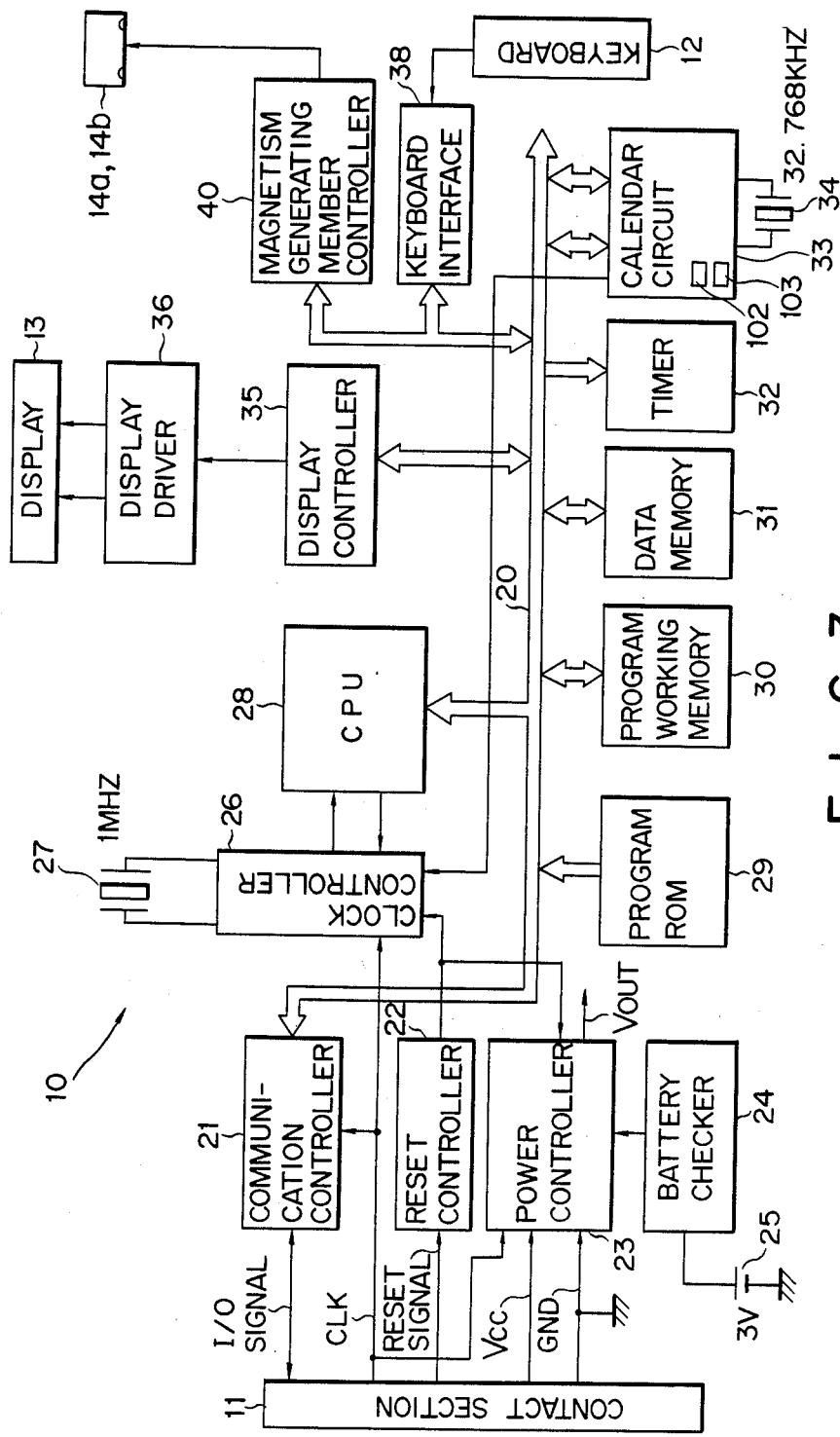
FIG. 3 is a block diagram of electric circuitry of the IC card.

The electric circuitry of IC card 10 is arranged as shown in FIG. 3. That is, IC card 10 includes contact section 11, communication controller 21, reset controller 22, and power controller 23. Further, the IC card includes built-in battery 25 having, for example, 3 volts, and battery checker 24 for checking whether the voltage of battery 25 is above a specified voltage or not. IC card 10 includes clock controller 26, oscillator 27 having a piezoelectric crystal element for generating a high frequency signal of 1 MHz, and CPU 28. Moreover, IC card 10 incorporates program ROM (read only memory) 29 storing control programs, program working memory 30, and data memory 31 storing a personal identification number (e.g. 4 digits) and data and being formed of PROM (programmable ROM). Further, IC card 10 comprises timer 32 used for keeping time during the data processings, calendar circuit 33, and oscillator (first clock generator) 34 having a piezoelectric crystal element adapted for generating basic clocks. The first clock generator is arranged to normally generate a low frequency and high precision signal of 32.768 KHz. In addition, IC card 10 includes display controller 35, display driver 36 for driving display 13, keyboard interface 38 receiving key inputs from keyboard 12, and magnetism generating member controller 40 for controlling magnetism generating members 14a and 14b.

Communication controller 21, CPU 28, ROM 29, program working memory 30, data memory 31, timer 32, calendar circuit 33, display controller 35, keyboard interface 38, and magnetism generating member controller 40 are interconnected by data bus 20.

Upon reception of a serial input signal from terminal 16 fed via contact section 11, communication controller 21 converts the serial input signal to a parallel signal which is in turn output to data bus 20. Upon receiving a parallel signal from data bus 20, communication controller 21 converts the parallel signal to a serial output signal which is output to terminal 16 via contact section 11. In this case the conversion formats are previously defined by terminal 16 and IC card 10.

Reset controller 22 generates a reset signal to start CPU 28 when an on-line operation is initiated. Power controller 23 switches the driving power supply from battery 25 to an external power supply after a predetermined time from the initiation of an on-line operation. When the operation is changed from on-line to off-line, namely when the external power supply (voltage) is lowered, power controller 23 switches the driving power supply from the external power supply to the internal power supply or battery 25.

During the off-line mode using built-in battery 25 for card operations, clock controller 26 stops oscillator circuit (second clock generator) 67 as described later, to generate the 1 MHz signal, and stops the supply of clocks to CPU 28 when the keyboard data has not been entered for a give time. Thus, clock controller 26 is brought to a complete halt and put on stand-by. Oscillator 67 is reactivated in response to the depression of power-on key (equal key) 12h. Clock controller 26 continually provides timekeeping clocks to CPU 28 after the depression of power-on key 12h until the next keyboard entry. And, upon the next keyboard entry, for example, upon the depression of mode key 12a, clock controller 26 outputs the high frequency clocks of 1 MHz.

Data memory 31 stores information as to the user's credit cards (companies) and information as to user's cash cards (banks). The information is read out in correspondence with the type of card selected by a combination of an M4 key and ten keys 12b, or by digits displayed on display 23 and the abbreviated names of the credit companies and banks with the use of ten keys 12b. The information is the same as information recorded on a conventional magnetic stripe of each card. For this reason, data memory 31 stores first track data which corresponds to the first track of the card and second track data which corresponds to the second track of the card.

Further, data memory 31 stores the expiration date of the IC card itself. The storage of this expiration date corresponds to the capacity of battery 25 which is checked by battery checker 24. When battery 25 falls below a predetermined level, battery checker 24 informs CPU 28 of this fact so that CPU 28 displays the expiration of date on display 13. The expiration date may be set for each of the registered credit and cash cards, but not for the IC card itself.

Further, data memory 31 stores the account number and a limit amount of money for purchases of the cash card that can perform an off-line processing during the purchase mode. The limit amount of money for purchases is renewed each time a purchase is made. A purchase number resulting from the purchase is recorded in a purchase situation recording area (not shown) of data memory 31. The purchase number is stored as cipher data using the purchase date provided by timekeeping device 102, described later, the purchase amount, and the account number as a cryptographic key.

Calendar circuit 33 comprises displaying timepiece (first timepiece) 103 of which the time can be freely set by the user of the card, and purchasing timepiece (second timepiece) 102 in which a standard time such as Japanese Standard time and Greenwich Time is set upon the issuance of the card. Second time piece 102 is unalterable and is protected from being displayed by display section 13.

Display controller 35 converts display data from CPU 28 to character patterns using a character generator (not shown) formed of a ROM in the controller. The character patterns are displayed by display section 13 with the aid of display driver 36. Keyboard interface 38 feeds CPU 28 with key input signals which correspond to the depressed keys on keyboard 12.

When the purchase mode and the type of the card are specified, magnetism generating member controller 40 drives magnetism generating members 14a and 14b in accordance with the data read out from data memory 31 and corresponding to the type of the card, and the driving rate is dependent upon whether the card reader is of a manual reading type or an automatic carrier reading type, to thereby provide magnetic information. In this case, the magnetic information includes first track data and second track data, so that IC card 10 is held in the same condition as in the case where the conventional magnetic stripes exist.

For example, in the case where the card reader is of a manual reading type, a driving rate in which the readout speed is high is selected. On the other hand, in the case where the automatic carrier trading type is used, the driving rate in which the readout speed is low is selected. During the purchase mode magnetism generating member controller 40 generates the magnetic information (the first track data or second track data) from one of magnetism generating members 14a and 14b that corresponds to the track specified by the operator in accordance with the type of the card being used. For example, a combination of "1" key in ten keys 12b and division key 12e specifies the first track, so that magnetism generating member 14a is caused to generate the magnetism for the first track. Or, "2" key and division key 12e specify the second track to cause magnetism generating member 14b to generate the magnetism for the second track.

The power controller 23 will be described in details referring to FIG. 4. As is shown, power controller 23 is made up of inverters 51, 54 and 55, counter 52, D type flip-flop (FF) 53, semiconductor switches 56 and 58 made up of MOSFETs, and diode 57. Power controller 23 is connected to built-in battery 25, through battery checker 24 (not shown in FIG. 4).

The count of counter 52 is not influenced by chattering of the external power supply. Diode 57 protects power voltage Vout. It keeps the power voltage Vout by using built-in battery 25, when the external power voltage Vcc drops below the drive voltage for the memory before semiconductor switch 56 is turned on.

The operation of the IC card thus arranged will be described referring to FIG. 5 illustrating a timing chart. When IC card 10 is not connected to terminal device 16 at contact section 11, semiconductor switch 56 is turned on. The power voltage of built-in battery 25 is distributed as the output Vout of power controller 23 to the related portions, via semiconductor switch 56.

When IC card 10 is connected to terminal device 16 at contact section 11, the external power voltage Vcc is supplied via contact 11a of contact section 11 to the gate of semiconductor switch 58. The clock signal CLK coming through contact section 11 from external is supplied to the clock terminal CK of counter 52, via contact 11c of section 11 and inverter 51. Upon receipt of this, counter 52 starts its counting. When the count of counter 52 reaches a predetermined value, the output at output terminal Qn sets FF 53. The set output Q of FF 53 places a "0" signal at the gate of semiconductor switch 58. A "1" signal is placed at the gate of semiconductor switch 56. Accordingly, semiconductor switch 58 is turned on, while switch 56 is turned off. The power voltage Vcc from external is applied as the output Vout of power controller 23 to the related portions via semiconductor switch 58.

When the IC card is returned from the on-line mode to the off-line mode, if the power voltage Vcc drops, reset controller 22 produces a reset signal. This reset signal resets counter 52 and FF 53. Then, a "1" signal is supplied to the gate of semiconductor switch 58, and a "0" signal is supplied to the gate of semiconductor switch 56. Then, switch 58 is turned off and switch 56 is turned on. As a result, the power voltage of battery 25 is supplied as the output Vout of power controller 23 to the related circuits, through semiconductor switch 56.

Figure 6:
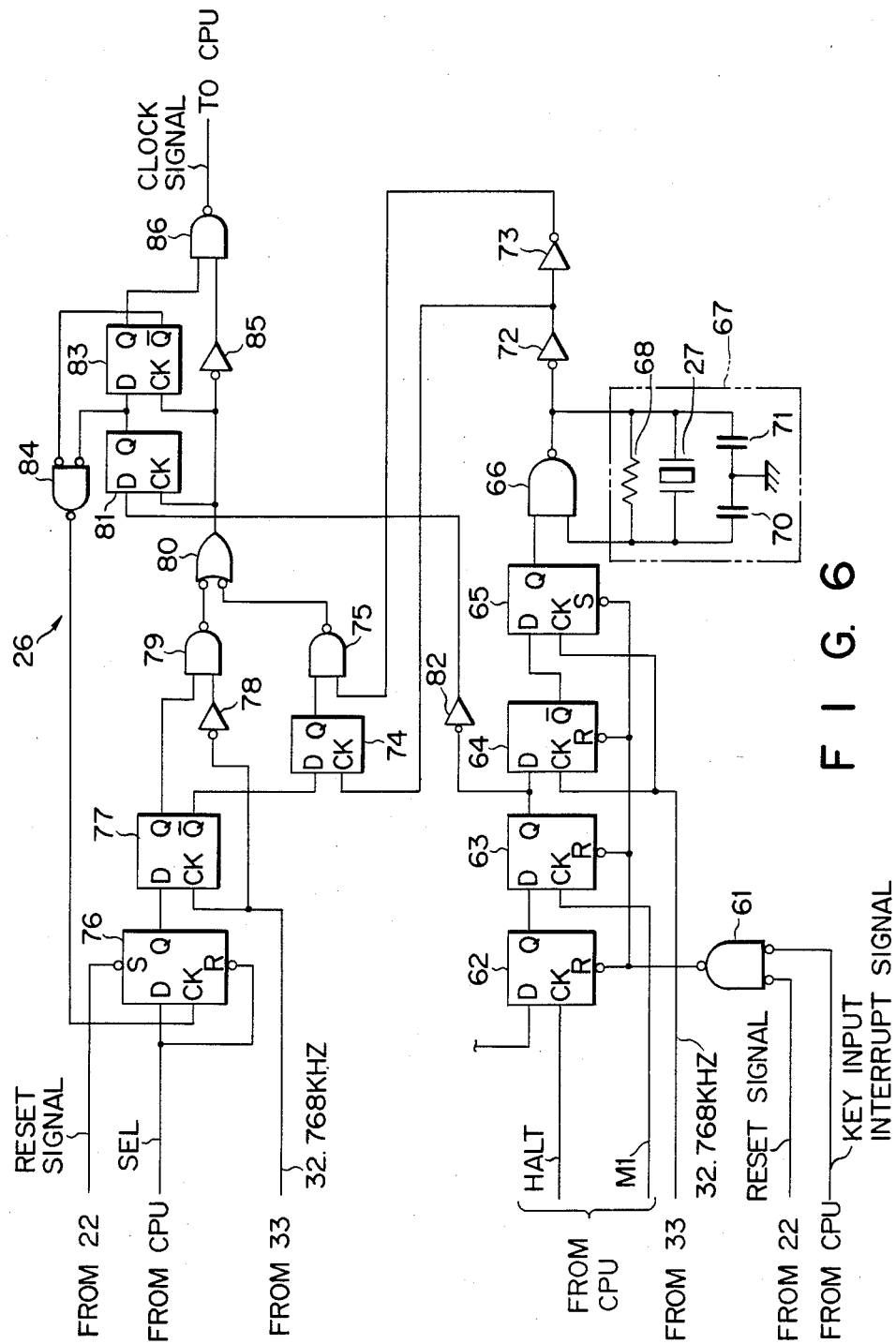
FIG. 6 shows an arrangement of the clock controller of FIG. 3.

The clock controller 26 will be described referring to FIG. 6. Halt signal HALT derived from CPU 28 is supplied to the clock input terminal CK of FF 62. The set signal from FF 62 is supplied to the data input terminal D of FF 63. Machine cycle signal M1 is supplied to the clock input terminal CK of FF 63. FFs 62 and 63 are for halt mode timings.

The set output of FF 63 is supplied to the data input terminal D of FF 64. The clock input terminal CK of FF 64 is supplied with the time display clock signal at 32.768 KHz derived from calendar circuit 33. The reset output of FF 64 is supplied to the data input terminal D of FF 65. The clock input terminal CK of FF 65 is supplied with the time display clock signal at 32.768 KHz from calendar circuit 33. FF 65 is for stopping the clock oscillation.

The set output of FF 65 is supplied to one input terminal of NAND gate 66. Oscillator circuit 67 is connected to between the other input terminal and the output terminal of NAND gate 66.

A key-in interrupt signal from CPU 28 and a reset signal from reset controller 22 are supplied through OR gate 61 to the reset input terminals R of FFs 62 to 64, and further to the set input terminal S of FF 65.

Oscillator circuit 67 is made up of oscillator 27 of 1 MHz oscillating frequency, resistor 68, and capacitors 70 and 71.

The output of NAND gate 66 is supplied to the clock input terminal CK of FF 74, through inverter 72. The output of NAND gate 66 is supplied to one input terminal of NAND gate 75 via inverters 72 and 73.

The reset signal from reset controller 22 is supplied to the set input terminal S of FF 76, and the output signal from OR gate 84 is supplied to the clock input terminal CK of FF 76. Clock select signal SEL derived from CPU 28 is supplied to the data input terminal D and the reset input terminal of FF 76. The set output of FF 76 is supplied to the data input terminal D of FF 77. The time display clock signal at 32.768 KHz is supplied to the clock input terminal CK of FF 77, from calendar circuit 33. The set output of FF 77 is supplied to one input terminal of NAND gate 79. The other input terminal of this gate is supplied with the time display clock at 32.768 KHz from calendar 33, through inverter 78. The output signal from NAND gate 79 is supplied to one input terminal of NAND gate 80.

The reset output of FF 77 is supplied to the data input terminal D of FF 74. The set output of FF 74 is supplied to the other input terminal of NAND gate 75. FF 74 is for clock selection.

The output signals from NAND gates 75 and 79 are supplied to NAND gate 80. The output of NAND gate 80 is supplied to the clock input terminal CK of FFs 81 and 83. The set output of FF 63 is supplied to the data input terminal D of FF 81, via inverter 82.

The set output of FF 81 and the reset output of FF 83 are supplied to the clock input terminal CK of FF 76, via OR gate 84.

The set output of FF 83 is applied to one input terminal of NAND gate 86. The other input terminal of NAND gate 86 is supplied with the output signal from NAND gate 80, through inverter 85. The output signal from NAND gate 86 is supplied to CPU 28, as a clock signal.

Figure 7A:
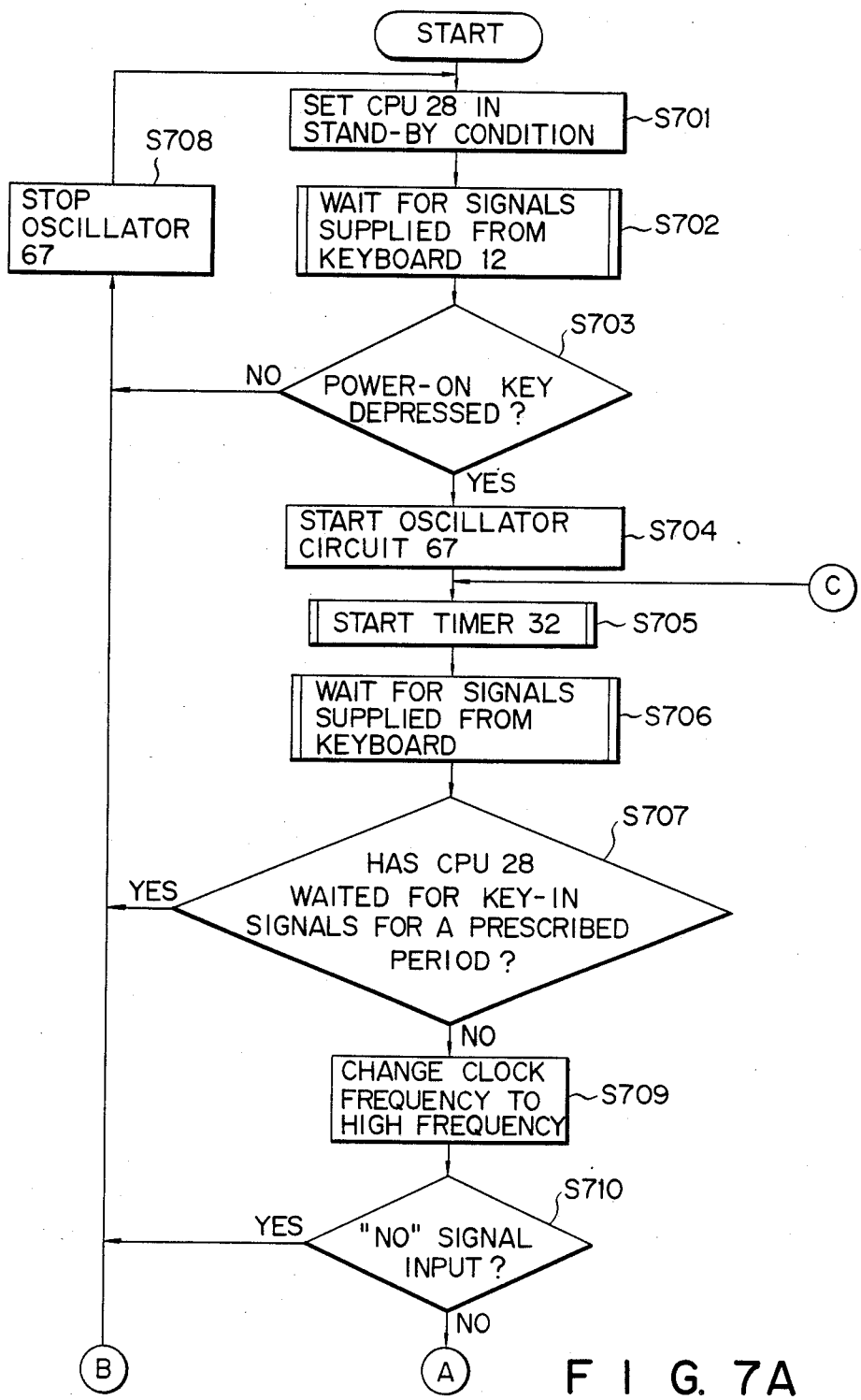

The off-line operation of the IC card described above will be explained with reference to the flowcharts of FIGS. 7A and 7B.

First, CPU 28 of IC card 10 is in the stand-by condition, in step S701. Therefore, CPU 28 remains to receive signals input by operating keyboard 12, in step S702. More specifically, CPU 28 supplies a "1" signal as clock select signal SEL, thereby setting FFs 76 and 77. The clock signal (32.768 KHz) for time display is thus supplied to FFs 81 and 82 and inverter 85 via inverter 78 and NAND gates 79 and 80, as can be understood from FIG. 6.

To restart oscillator circuit 67 which has been halted, equal key 12h, which is used as a power-on key, is depressed while CPU 28 is waiting for signals input by operating keyboard 12. In step S703, it is determined whether or not the power-on key has been operated. Thus, YES in step S703, and the operation goes to the next step, S704. In step S704, CPU 28 supplies a key-input interrupt signal to clock controller 26. As a result, FFs 62, 63, and 64 are reset, and FF 65 is set. The set output of FF 65 enables oscillator circuit 67. Hence, oscillator circuit 67 resumes its operation.

Meanwhile, when FF 63 is set, a "1" signal is supplied to the data input terminal D of FF 81. FFs 81 and 83 are therefore set upon receipt of the output signal of NAND gate 80, whereby NAND gate 86 is opened. The clock signal for time display, which has been supplied to inverter 85 via inverter 78 and NAND gates 79 and 80, is input to CPU 28 via NAND gate 86. The time-display clock signal supplied from calendar circuit 33 drives CPU 28. CPU 28 starts timer 32 in step S705. Then, CPU 28 waits for signals input by operating keyboard 12, in step S706.

In step S707, it is determined whether or not CPU 28 has been waiting for key-input signals for a predetermined period of time. If YES, CPU 28 stops oscillator circuit 67 in step S708, and is set in the stand-by condition, in step S701. That is, CPU 28 supplies the signal HALT to the clock input terminal CK of FF 62, thereby setting FF 62. The set output of FF 62 is input to the data input terminal D of FF 63. A machine cycle signal M1 from CPU 28 sets FF 63, whereby a "0" signal is supplied to the data input terminal D of FF 81. The set output of FF 63 is delayed by a two-pulse time, by FFs 81 and 83, and then is input to NAND gate 86. This signal disables NAND gate 86, where the clock signal is no longer supplied to CPU 28. CPU 28 is thus halted. In the meantime, the set output of FF 63 is delayed by a two-pulse period by means of FFs 64 and 65, and then is input to NAND gate 66. Thus, oscillator circuit 67 is halted.

If NO in step S707, that is, if CPU 28 has not been waiting for key-in signals for the predetermined period of time, the operation goes to step S709, in which the frequency of the clock signal is switched from the low frequency to a high frequency. More precisely, CPU 28 supplies a "0" signal, as a clock select signal SEL, to the data input terminal D of FF 76, in response to the signal generated by operating any mode key 12a and supplied from keyboard 12. As a result, FFs 76 and 77 are reset. The reset output of FF 77, i.e., a "1" signal, is supplied to the data input terminal D of FF 74. A period of 500 to 600 msec or more elapses before any mode key 12a is pushed again. Thus, oscillator circuit 67 can operate stably.

The high-frequency clock signal (1 MHz) from oscillator circuit 67 is supplied to the clock input terminal CK of FF 74, via inverter 72.

Accordingly, FF 74 is set, so that NAND gate 75 is enabled. As a result, the high-frequency clock signal (1 MHz) from oscillator 67 is output to CPU 28, through inverters 72 and 73, NAND gates 75 and 80, inverter 85, and NAND gate 86 in this order.

In this way, the clock select signal SEL is set to logical "0", the clock signal is changed from the time display clock to the high speed processing clock under the synchronism control by FF 74.

Then, in step S710, it is determined whether the signal input from keyboard 12 is a NO signal or not. If YES, that is if decimal key 12g has been depressed, the operation return to step S708, in which oscillator circuit 67 is stopped.

If NO in step S710, CPU 28 performs the operation designated by the signal generated by operating keyboard, in step S711. In the next step, S712, CPU 28 waits for the next signal input by operating keyboard 12. In step S713, it is determined whether or not CPU 28 has been waiting for key-input signals for a predetermined period of time. If YES, CPU 28 stops oscillator circuit 67 in step S708, as has been described above. The operation then returns to step S701, whereby CPU 28 comes into the stand-by condition.

If NO in step S713, that is, if CPU 28 receives a key-input signal before said period of time expires, the operation goes to step S714. In step S714, it is determined whether or not this key-input signal has been generated by operating any function key, or by operating decimal key 12g (i.e., the NO key). If a function key has been depressed, the operation returns to step S711, whereby CPU 28 performs the operation specified by this function signal. If decimal key 12g (i.e., the NO key) has been pushed, the operation returns to step S705, whereby CPU starts timer 32.

To set to the stand-by mode after the IC card has processed data, the clock select signal SEL is set to "1", and FFs 76 and 77 are set. The set output of FF 77, i.e. a "1" signal, is applied to NAND gate 79, enabling the same gate. The time display signal (32.768 KHz) is output to CPU 28, through inverter 78, NAND gates 79 and 80, inverter 85, and NAND gate 86 in this order. As a result, the time display clock signal (32.768 KHz) is output to CPU 28.

The signal HALT is input to the clock input terminal CK of FF 62, from CPU 28. FF 62 is set, and the set output of FF 62 is input to the data input terminal D of FF 63. A machine cycle signal M1 from CPU 28 sets FF 63, and a "0" signal is supplied to the data input terminal D of FF 81. The set output of FF 63 is delayed by two-pulse period by FFs 81 and 83, and applied to NAND gate 86. By this signal, NAND gate 86 is disabled, to stop the transfer of the clock signal to CPU 28. Finally, the CPU 28 is in a halt state.

The set output of FF 63 is delayed by two-pulse period by FFs 64 and 65, and transferred to NAND gate 66. As a result, NAND gate 66 is disabled, and the oscillation by oscillator circuit 67 is stopped. In this way, the outputting of the clock signal to CPU 28 is halted and then oscillation circuit 67 is also halted.

In this way, clock controller 26 effectively selects the time display clock signal of low-frequency (32.768 KHz) or the 1 MHz clock signal (i.e., the high-frequency signal), in order to assist the rise of oscillation of oscillator 27.

Figure 8:
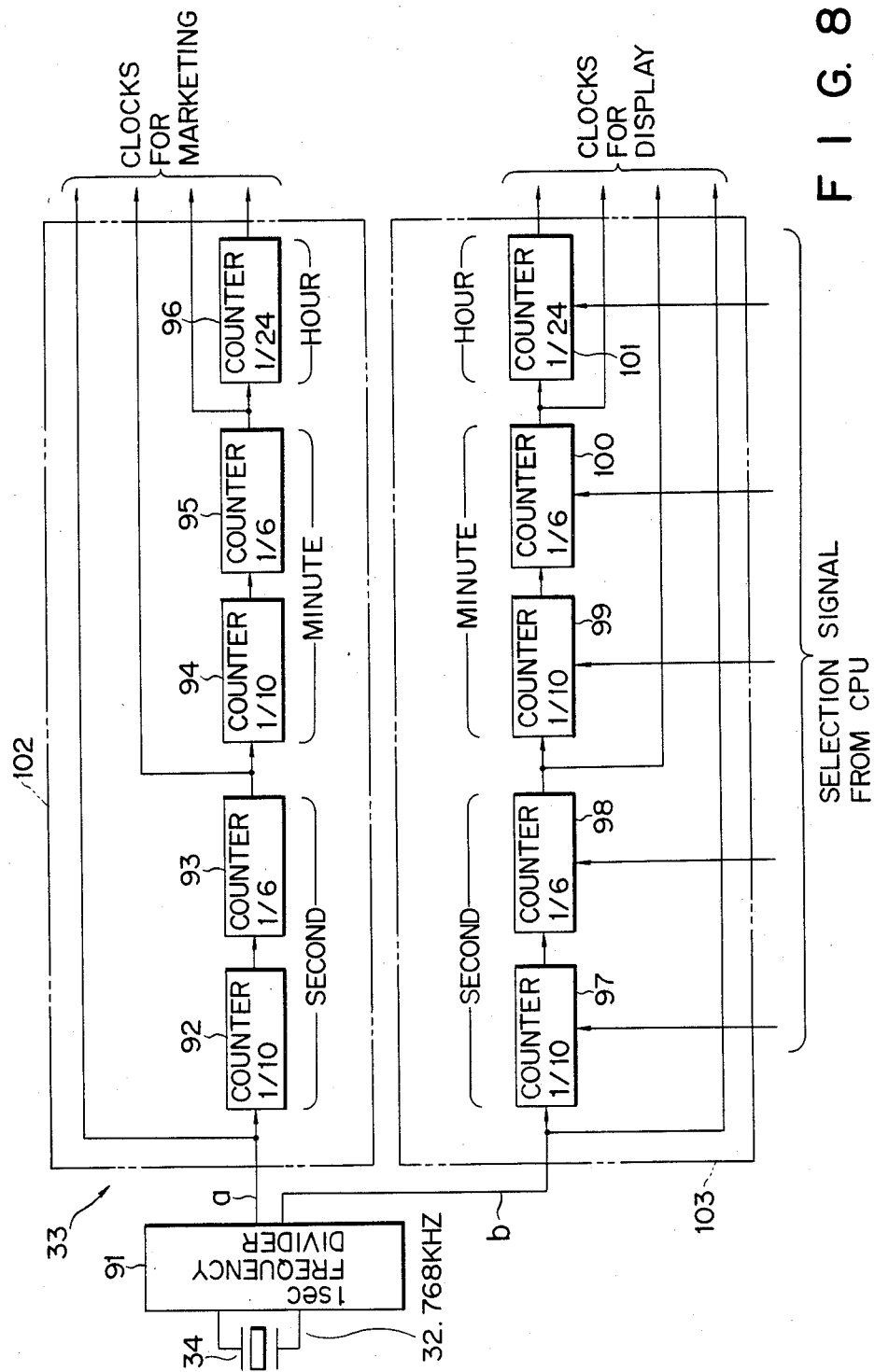
FIG. 8 is a block diagram of the calendar circuit of FIG. 3.

The calendar circuit 33 will be described referring to FIG. 8. Calendar circuit 33 is composed of frequency divider 91 and counter 92 to 101. Frequency divider 91 frequency-divides the oscillation output signal of oscillator 34 at 32.768 KHz, and output signals every one second at output terminals a and b.

Counter 92 counts the signals from output terminal of frequency divider 91, and outputs signals every ten seconds. Counter 93 counts the signal from counter 92 and outputs signals every 60 seconds, or one minute. Counter 94 counts the signal from counter 93, and outputs signals every ten minutes. Counter 95 counts the signal from counter 94 and outputs signals every 60 minutes or one hour. Counter 96 counts the signal from counter 95 and outputs signals 24 hours or one day. The every-one-second signal from output terminal a of frequency divider 91, the every-one-minute signal from counter 93, the every-one-hour signal from counter 95, and the every-one-day signal from count 96 are supplied to data bus 20.

Counter 97 counts the signal from the output terminal b of frequency divider 91, and outputs signals every ten seconds. Counter 98 counts the signal from counter 97, and outputs signals every 60 seconds or one minute. Counter 99 counts the signal from counter 98 and outputs signals every ten minutes. Counter 100 counts the signal from counter 99, and outputs signals every 60 minutes or one hour. Counter 101 counts the signal from counter 100, and outputs signals every 24 hours or one day. The every-one-second signal from output terminal b of frequency divider 91, the every-one-minute signal from counter 98, the every-one-hour signal from counter 100, and the every-one-day signal from count 101 are supplied to data bus 20.

These counters 92 to 96 form transaction time-keeping device (second timepiece) 102 for counting second, minute and hour. Counters 97 to 101 form first timepiece 103 for counting second, minute and hour. In this case, the count of each counter 97 to 101 can be changed by keyboard section 12. The set signal produced by the key-in operation is supplied to counters 97 to 101, from CPU 28. Counters 97 to 101 are set to the counts based on the set signals. The setting of the count values of these counters can be performed in the well known manner. The contents, i.e. the count, of counters 92 to 96 cannot be changed by keyboard section 12.

The signals of the 24-hour counters 96 and 101 can be used as the interrupt signals to CPU 28. Upon request by these signals, CPU 28 updates the date and day of the week in the corresponding area by using data memory 31.

When the date and days of the week are updated, CPU 28 reads out the effective period from data memory 31, and compares it with the date updated by counter 96, i.e. the date corresponding to timepiece 102. When it is found, as the result of comparison, that the effective period of the IC card expires, the data to prohibit use of the card is stored into data memory 31. In such a case, display section 13 displays the prohibition of card usage when the card is next used.

Two timepieces 102 and 103 have different phases of one second clock signal as is shown in FIG. 9, and this inhibits the concurrence of the interrupts.

The magnetism generating member controller 40 will be described in details referring to FIG. 10. The command data supplied through data bus 20 from CPU 28 is transferred to FF 110 for command. FF 110 is made up of four FFs, and outputs at the output terminal a a clock select signal corresponding to the drive rate for the first track, according to the command data supplied from data bus 20. The same produces a clock select signal corresponding to the drive rate for the second track at the output terminal c. A start signal is produced from output terminal d. The clock input terminal CP of FF 110 is supplied with a command write start signal from CPU 28. The clock select signal corresponding to drive rate represents whether the terminal device is a manual reading type or an automatic carrier reading type.

The clock select signal from the output terminal a of FF 110 is supplied to the input terminal S of select circuit 111. The input terminal A of select circuit 111 is supplied with the signal at 8 KHz from the oscillator (not shown), while the input terminal B, with a 4 KHz signal from the oscillator (not shown). Select circuit 111 selects the signal from the terminal A or B according to the clock select signal of FF 110, and outputs the selected signal at the output terminal Y. When the terminal device is of the manual reading type, the terminal A is selected, and it is output at the output terminal Y. When the terminal device is of the automatic carrier reading type, the signal at the input terminal B is selected and output at the output terminal Y.

The start signal output from the output terminal b of FF 110, and the output signal from select circuit 111 are supplied to timing circuit 112. Timing circuit 112 generates a scale-of-7 clock signal, and supplies it to the clock input terminal CP of parallel/serial converter 115. The first clock signal is supplied as a load signal to the load input terminal L of parallel/serial converter 115. Timing circuit 112 supplies the clock signals for data "1" and "0" to selector 116.

The magnetic data supplied through bus 20 from CPU 28, which is the first track data identifying the type of the IC card, is applied to data latch circuit 113. The data write start signal is supplied to data latch circuit 113, from CPU 28. Data latch circuit 113 latches the magnetic data each of 7 bits from data bus, when CPU 28 issues a data write start signal.

The data latched in data latch circuit 113 is supplied to the data input terminal IN of parallel/serial converter 115 for 7 bits. Upon receipt of the load signal supplied, this converter 115 fetches the data from data latch circuit 113, and shifts the fetched data into serial bit signals ("1" or "0" signal), and outputs them bit by bit in serial manner.

The output signal from the converter 115 is supplied to the input terminal S of selector 116. When the "1" signal is input to the input terminal S, selector 116 selects and outputs the clock signal for data "1" as supplied from timing circuit 112. When a "0" signal is input to the input terminal S, it selects and outputs the clock signal for data "0" as supplied from timing circuit 112.

The output signal from selector 116 is applied to J-K FF 117. The set output and reset output of this J-K FF 117 are supplied to driver 118.

The driver 118 drives the magnetism generating member 14a in accordance with the signal from FF 117, and generates a magnetism. For example, when the FF 117 is set, a magnetism as indicated by arrow c is generated. When reset, the magnetism generated is as shown by arrow d.

A timing chart of the signal at principal parts in magnetism generating member controller 40 is as shown in FIG. 11.

In selector 116, the clock cycles of data "1" and "0" are given at the ratio of 1:2, as shown in FIG. 12. By this clock, J-K FF 117 is operated in the inverted mode, to produce "1" and "0" signals as formatted necessary for the magnetic data, and the magnetism generating member 14a is driven by these signals.

The data write start signal from CPU 28 is inverted and input to the set input terminal S of FF 114 for empty detection. The first clock from timing circuit 112 is inverted and supplied to the reset input terminal R of FF 114. As a result, when the data from data latch circuit 113 is loaded into converter 115, FF 114 is set, and the set output or the buffer empty signal is sent to CPU 28.

Upon receipt of the buffer empty signal, CPU 28 determines that it is ready for the next data setting, and outputs the next data to data latch circuit 113. In this way, CPU 28 senses the output signal from empty detecting FF 114, and sets the data successively, and after all of data are output, it turns off the command write start signal and the data write start signal. As a result, the signal generation by timing circuit 112 is stopped, and the operation terminates.

These circuits 111 to 118 form a circuitry for the first track. Similarly, the circuitry for the second track is made up of select circuit 119, timing circuit 120, data latch circuit 121, empty detection FF 122, parallel/serial converter 123, selector 124, J-K FF 125, and driver 126. The circuitry for the second track is different from the first track circuitry in that in the former, timing circuit 120 operates in the scale-of-5 mode.

Controller 40 controls magnetism generating members 14a and 14b such that these members 14a and 14b generate magnetic fields in accordance with the data read out from data memory 31, which is equivalent to the data recorded on the magnetic stripe of a credit card o a cash card. Therefore, the magnetic head (not shown) of IC card read/write unit 16 (FIG. 12) reads the same signals as are recorded on the magnetic stripe. Magnetism generating member 14a outputs the first-track data of IC card 10, whereas magnetism generating member 14b outputs the second-track data of IC card 10.

The operation of IC card 10 will be described. The off-line mode, in which the card is used by itself, will first be described. When the hand-held calculator mode is designated by operating mode key 12a, i.e., M1 key, the IC card can be used as a hand-held calculator with ten keys 12b and the arithmetic keys 12c.

When mode key 12a, i.e., M2 key, is operated one time to designate the time display mode, CPU 28 reads out the data of second, minute, and hour for time display from the counters 97 to 101 in calendar circuit 33. Further, it reads out the data of the date and day of the week from data memory 31, and converts the format as specified, and outputs it to display controller 35. As a result, display controller 35 converts the data into the character pattern using the internal character generator (not shown), and displays it through display driver 36 and display section 13.

When mode key 12a, or M2 key, is pushed twice to designate the time change mode, the circuitry operates in the time display mode, and displays the data of second, minute, hour, date and day of the week by display 13. Then, these pieces of data are set and altered by pushing ten keys 12b. CPU 28 changes the corresponding set contents, or the counts of counters 97 to 101, and the contents of data memory 31. Such data is changed by operating mode key 12a.

When the pocketbook mode is designated by mode key 12a, i.e., M3 key, CPU 28 reads out the address, name, telephone number, and the like from data memory 31. These data items are displayed by display section 13. To register the address, names, and the like in the electronic pocketbook, ten keys 12b are used. Characters "A", "B", "C", "D", . . . can be designated by pushing M1 key and "2" key, M2 key and "2" key, M3 key and "2" key, and M1 key and "3" key, and so forth.

When mode key 12a, or M4 key is used for designating the purchasing mode in which unit 16 can read data from the magnetic stripe, the type of contacted credit card and the type of output terminals, i.e., the manual reading type or automatic carrier reading type, can be selected by operating ten keys 12b. Further, magnetism generating member 14a or magnetism generating member 14b is selected, so that either the first-track data or the second-track data may be output.

More specifically, the user operates ten keys 12b in accordance with the images of numeral keys, the abbreviations of credit company names, the abbreviations of bank names and the like, all displayed on display section 13, thereby designating the credit card or the cash card which he or she is going to use. When the card is designated, display 13 displays the question "Reader: Manual?." If YES, the user pushes equal key 12h, or the YES key. If NO, he or she pushes addition key 12c, or the NEXT key. When addition key 12c is depressed, display 13 displays the question "Reader: Automatic?." If YES, the user operates equal key 12h, or the YES key, thereby selecting the reader of the automatic carrier reading type. Thereafter, the user pushes the "1" key, i.e., one of ten keys 12b, and division key 12e, thereby designating the first track so that the first-track data can be output. Alternatively, he or she pushes the "2" key, i.e., one of ten keys 12b, and division key 12e, thereby selecting the second track so that the second-track data can be output.

Then, CPU 28 reads 72-character data from data memory 31, which is either the first-track data or the second-track data, of the credit or cash card. This data is supplied to controller 40. CPU 28 outputs data representing the rate at which controller 40 must drive magnetism generating member 14a or 14b, whichever selected, so that the reader of the manual or the automatic carrier reading type, whichever selected, can read signals generated by member 14a or 14b. Further, CPU 28 outputs command data, command-write start signal, and data-write start signal to controller 40.

When the START key 12f (i.e., the multiplication key) is depressed, CPU 28 outputs a start signal to controller 40. In response to the start signal, controller 40 drives magnetic generating member 14a if the first-track data is required, whereby magnetism generating member 14a generates the magnetic field equivalent to the first-track data of the credit card. As a result, the magnetic head (not shown) of IC card read/write unit 16 reads the same signals as from the first-track of a magnetic stripe of the conventional credit card. If the drive-rate data output from CPU 28 represents the drive rate suitable for a manual reading type reader, an 8 KHz signal is used as the clock signal for driving magnetism generating member 14a. Hence, member 14a generates magnetic signals at higher rate in synchronism with this 8 KHz clock signal. On the other hand, if the drive-rate data output from CPU 28 represents the drive rate suitable for an automatic carrier reading type reader, a 4 KHz signal is used as the clock signal for driving member 14a. In this case, member 14a generates magnetic signals at lower rate in synchronism with this 4 KHz clock signal.

If the second-track data is required, controller 40 drives magnetic generating member 14b, whereby member 14b generates the magnetic field equivalent to the second-track data of the credit card. Therefore, the magnetic head (not shown) of IC card read/write unit 16 reads the same signals as from the second track of a magnetic stripe of the credit card. If the drive-rate data supplied from CPU 28 represents the drive rate suitable for a manual reading type reader, a 4 KHz signal is used as the clock signal for driving member 14b. Member 14 generates magnetic signals at higher rate in synchronism with this 4 KHz clock signal. On the other hand, if the drive-rate data output from CPU 28 represents the drive rate suitable for an automatic carrier reading type reader, a 2 KHz signal is used as the clock signal for driving magnetism generating member 14b. In this case, member 14b generates magnetic signals at a lower rate in synchronism with this 2 KHz clock signal.

As may be understood from the above, IC card 10 can be used as a credit card when it is set in the purchase mode.

Either the first track or the second track remains selected until END key 12g (i.e., the decimal key) is pushed, or until the other track is selected. The magnetic data is repeatedly produced by magnetism generating member 14a or 14b as long as START key 12f (i.e., the division key) is kept depressed. No matter how many times the same magnetic data is output, the same track remains selected.

When the off-line mode is designated by operating mode key 12a, i.e., M4 key, and ten keys 12b, CPU 28 determined that the off-line mode using the cash card is set up, and reads out the account number of the limit of transaction of the cash card from data memory 31. Then, the date and the amount of the purchase are entered by operating ten keys 12b. CPU 28 checks whether or not the transaction is possible, from the difference between these pieces of data. If the transaction is possible, CPU 28 encodes the account number, the date for the clock 102, and the amount. The encoded data are written, as the transaction data, into the marketing recording area of data memory 31. CPU 28 displays the transaction number and the transaction permission by display section 13. The clerk writes the transaction number in the purchasing table, and transfers it to the card holder.

As a result, since the account number, date and amount identified the transaction number, it can be checked that the purchasing, i.e., transaction, has been made or not.

The on-line function, which is possible when IC card 10 is inserted into IC card read/write unit 16, will be described. To begin with, IC card 10 is through slit 17, thereby connecting contact section 11 with the corresponding portion of unit 16. When the power voltage is supplied to IC card 10 from unit 16 via contact section 11, it is supplied to power controller 23, built-in battery 25 is disconnected from controller 23. Reset controller 22 generates a reset signal which in turn drives CPU 28. After this drive, CPU 28 determines that the IC card is in the on-line mode, and executes the on-line processing under the control of program ROM 29. More specifically, the data exchange between unit 16 and IC card 10 is performed, and new data is written into IC card.

As has been described above, the oscillator circuit incorporated in IC card 10, i.e., the portable medium according to this invention, is turned off whenever unnecessary, thereby to reduce the power consumption of IC card 10. In addition, the wait time, or the rising time of the oscillator circuit, can be reduced, and CPU 28 receives the key-input signals without fail. The IC card according to the invention operates very reliably, and its lifetime is long.

When CPU 28 is halted in the off-line mode, oscillator circuit 67 starts outputting a high-frequency clock signal upon depression of the power-on key (i.e., equal key 12h), and this high-frequency clock signal is input to CPU 28 the moment the next key-input signal is supplied from keyboard 12. Therefore, the high-frequency clock signal has been sufficiently stabilized when it is input to CPU 28.

The high-frequency clock signal is supplied to CPU 28 while CPU 28 is processing data. Hence, CPU 28 can process data at high speed. When CPU 28 is waiting for key-input signals longer than a predetermined period of time, it is halted. While CPU 28 is thus halted, no clock signals are supplied to CPU 28. Further, when CPU 28 has been waiting for key-input signals longer than a predetermined period of time, or when a specified key is operated, the supply of the high-frequency clock signal to CPU 28 is stopped, thus halting CPU 28. Therefore, CPU 28 can process data at high speed, consuming a relatively small amount of power.

In the embodiment described above, the high-frequency clock signal is supplied to CPU 28 when any mode key 12a is depressed. Instead, the high-frequency clock signal is used in place of the low-frequency clock signal, only while CPU 28 requires the high-frequency clock signal to generate, for example, the code representing a transaction (or a purchase) has been made. This method helps to reduce the power consumption even more. Moreover, if the clock signal is switched from the low-frequency one to the high-frequency one after it has been ascertained that the high-frequency clock signal has been sufficiently stabilized, then there is no possibility that the IC card circuit is locked. Such switching of the clock signal can be accomplished by the use of clock controller 26' shown in FIG. 13.

Figure 13:
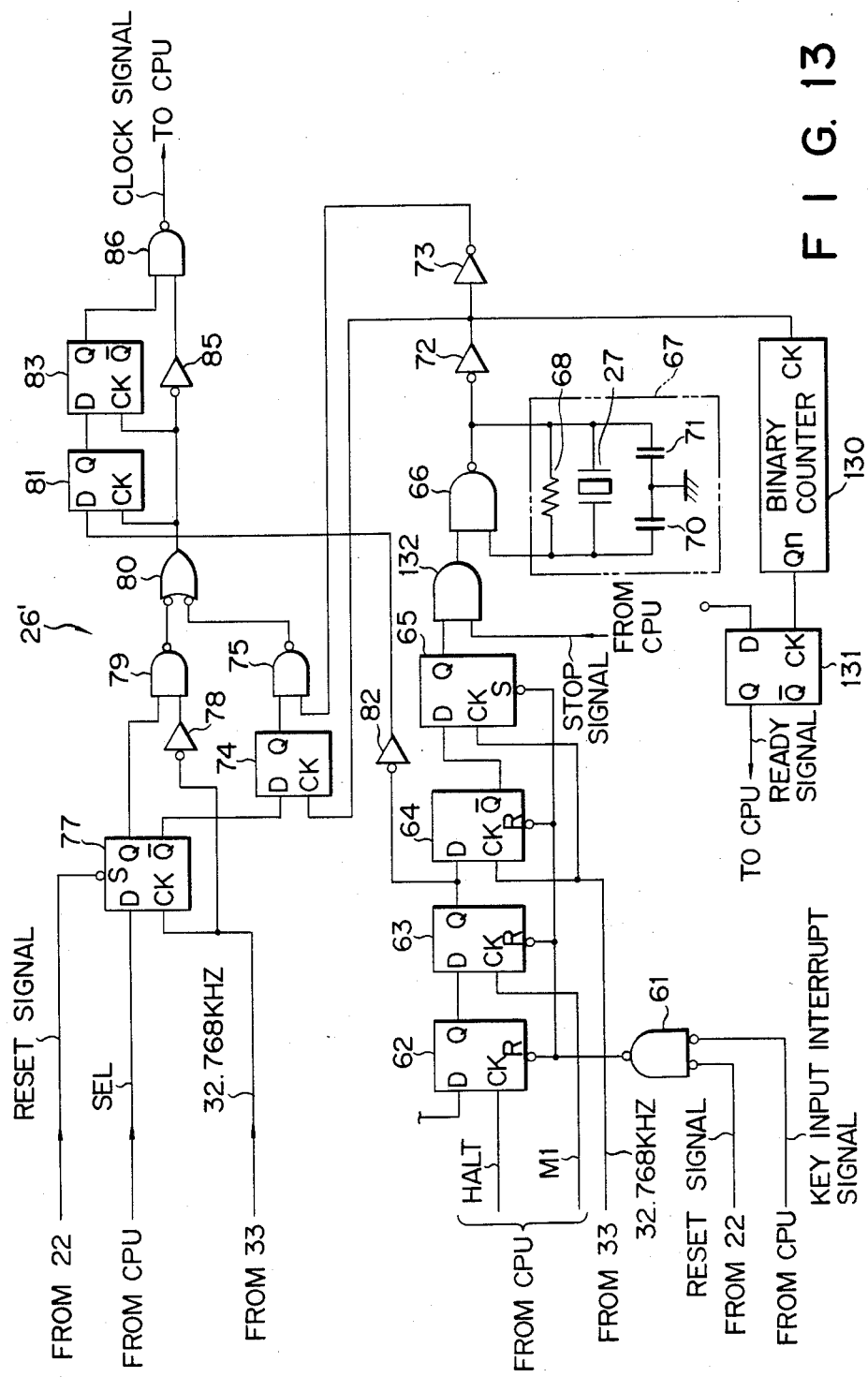
FIG. 13 shows an arrangement of the clock controller of FIG. 4 according to another embodiment of this invention.

As is shown in FIG. 13, a signal HALT output by CPU 28 is supplied to the clock input terminal CK of FF 62. The set output of this FF 62 is supplied to the data input terminal D of FF 63. Machine cycle signal M1, which has been output from CPU 28, is supplied to the clock input terminal CK of FF 63. FFs 62 and 63 function to determine the time at which CPU 28 must be halted.

The set output of FF 63 is supplied to the data input terminal D of FF 64. The clock signal of 32.768 KHz, which has been output by calendar circuit 33, is supplied to the clock input terminal CK of FF 64. The reset output of FF 64 is supplied to the data input terminal D of FF 65. The clock signal of 32.768 KHz is also supplied to the clock input terminal CK of FF 65. FF 65 serves to stop oscillator circuit 67.

The set output of FF 65 is supplied to the first input terminal of two-input AND gate 132. A stop signal, which has been output from CPU 28, is supplied to the second input terminal of AND gate 132. The output of AND gate 132 is supplied to the first input terminal of two-input NAND gate 66. Oscillator circuit 67 is connected between the second input terminal of the output terminal thereof.

A key-input interrupt signal supplied from CPU 28, and a reset signal output from reset controller 22 are supplied to OR gate 61. The output signal of this OR gate is supplied to the reset terminals R of FFs 62, 63, and 64. It is also supplied to the set input terminal S of FF 65.

Oscillator circuit 67 comprises oscillator 27 for generating a 1 MHz signal, resistor 68, and capacitors 70 and 71, as is illustrated in FIG. 13.

The output of NAND gate 66 is supplied to the clock input terminal CK of FF 74 via inverter 72, and also to the clock input terminal CK of binary counter 130 via inverter 72. The output of NAND gate 66 is also supplied to the first input terminal of two-input NAND gate 75 via inverters 72 and 73.

Binary counter 130 counts the pulses forming the clock signal output by oscillator circuit 67. When its count reaches a predetermined value, it outputs a signal from its output terminal Qn. This signal is supplied to the clock input terminal CK of FF 131. The set output of FF 131 is supplied, as a ready signal, to CPU 28. FF 131 is set by the output signal output by binary counter 130. In other words, it is set when the clock signal generated by oscillator circuit 67 becomes sufficiently stable. Hence, the ready signal represents that the clock signal has been sufficiently stabilized.

The reset signal output by reset controller 22 is supplied to the set input terminal S of FF 77. A clock select signal SEL, which has been output by CPU 28, is supplied to the data input terminal D of this FF 77. A low-frequency clock signal of 32.763 KHz, output by calendar circuit 33 is supplied to clock input terminal CK of FF 77. The set output of FF 77 is supplied to the first input terminal of two-input NAND gate 79. The low-frequency clock signal supplied from calendar circuit 33 is supplied to the second input terminal of NAND gate 79 via inverter 78. The output signal of NAND gate 79 is supplied to the first input terminal of two-input NAND gate 80.

The reset output of FF 77 is supplied to the data input terminal D of FF 74. The set output of FF 74 is supplied to the second input terminal of NAND gate 75. FF 74 is used to switching the frequency of a clock signal.

The outputs of NAND gates 75 and 79 are supplied to input NAND gate 80. The output of NAND gate 80 is supplied to the clock input terminals CK of FFs 81 and 83. The set output of FF 63 is supplied to the data input terminal D of FF 81 via inverter 82.

The set output signal of FF 83 is supplied to the first input terminal of NAND gate 86. The output of NAND gate 80 is supplied to the second input terminal of NAND gate 86 via inverter 85. The output of NAND gate 86 is supplied, as a clock signal, to CPU 28.

In order to restart oscillator circuit 67 which has been halted, the POWER-ON key 12h (i.e., the equal key) is pushed, whereby the key-input interrupt signal is supplied from CPU 28 to clock controller 26'. The key-input interrupt signal resets FFs 62, 63, and 64, and sets FF 65. The set output of FF 65 enables oscillator circuit 67, and circuit 67 starts operating.

When FF 63 is reset, a "1" signal is supplied to the data input terminal D of FF 81. Thus, FFs 81 and 83 are set by the output signal of NAND gate 80, whereby NAND gate 86 is opened. The low-frequency clock signal supplied from inverter 85 is supplied to CPU 28 via NAND gate 86. CPU 28 therefore performs various operations in synchronism with the low-frequency clock signal supplied from NAND gate 86.

The clock signal of 1 MHz, which has been output by oscillator circuit 67, is supplied to the clock input terminal CK of FF 74 via inverter 72, and also to the clock input terminal CK of binary counter 130 via inverter 72. Binary counter 130 counts the pulses forming the clock signal output from oscillator circuit 67. When its count reaches a prescribed value, binary counter 130 outputs a signal. This signal sets FF 131.

Upon lapse of a predetermined time after the key-input signal has been supplied from keyboard 12, CPU 28 determines whether or not FF 131 is set. In other words, CPU 28 determines whether or not oscillator circuit 67 is correctly operating. More specifically, when FF 131 is set, CPU 28 determines that oscillator circuit 67 is correctly operating. Conversely, when FF 131 is not set, CPU 28 determines that oscillator circuit 67 is malfunctioning. If oscillator circuit 67 is correctly operating, CPU 28 starts operating in synchronism with the pulses of the high-frequency clock signal. If oscillator circuit 67 is malfunctioning, CPU 28 keeps on operating in synchronism with the pulses of the low-frequency clock signal.

As has been explained above, CPU 28 supplies a "0" signal, as a clock select signal SEL, to the data input terminal D of FF 77, thereby resetting FF 77. The reset signal of FF 77, i.e., the "1" signal, is supplied to the data input terminal D of FF 74. FF 74 is therefore set. The set output of FF 74 opens NAND gate 75. As a result, the high-frequency clock signal (1 MHz) is output to CPU 28 via inverters 72 and 73, NAND gates 75 and 80, inverter 85, and NAND gate 86. In this way, FF 74 serves to switch the clock signal from the low-frequency clock signal to the high-frequency clock signal when the clock select signal SEL is set the "0" level. CPU 28 therefore starts operating in synchronism at high speed in synchronism with the pulses of the high-frequency clock signal.

After CPU 28 has started operating at high speed, clock select signal SEL is set at the "1" level. Then, the set output of FF 77, i.e., the "1" signal, is supplied to NAND gate 79, thus opening this gate 79. Hence, the clock signal (32.768 KHz) for the timepiece is output to CPU 28 via inverter 78, NAND gates 79 and 80, inverter 85, and NAND gate 86. This clock signal of low-frequency (32.768 KHz) is, therefore, output to CPU 28. CPU 28 operates at low speed in synchronism with the pulses of this low-frequency clock signal, thereby performing various operations.

When the stop signal (i.e., a "0" signal) is supplied from CPU 28 to AND gate 132, AND gate 132 is closed, thus disabling oscillator circuit 67. In other words, oscillator circuit 67 is halted.

When oscillator circuit 67 is found to be malfunctioning, CPU 28 supplies a stop signal (i.e., a "0" signal) to AND gate 132, while supplying a "1" signal, as the clock select signal, to the data input terminal D of FF 77. Hence, oscillator circuit 67 is disabled and thus stops outputting the clock signal, while the low-frequency clock signal is being output from FF 86. As a result, the low-frequency clock signal is output to CPU 28. CPU 28 is driven by the low-frequency clock signal, and performs various operations.

It will now be explained how CPU 28 operates when the purchase mode is selected. When purchase-mode key M4 is pushed, CPU 28 stops supplying the stop signal to AND gate 132. Then, the set output of FF 65 is input to oscillator circuit 67 via AND gate 132, thus enabling oscillator circuit 67. Oscillator circuit 67 therefore starts generating the high-frequency (1 MHz) clock signal. This clock signal is supplied to the clock input terminals CK of FF 74 and binary counter 130, via inverter 72. Hence, binary counter 130 counts the pulses of the high-frequency clock signal output by oscillator circuit 67. When its count reaches the prescribed value, binary counter 130 produces an output signal. This signal sets FF 131.

In order to make a purchase possible, CPU 28 then operates in the following manner. First, CPU 28 determines whether or not FF 131 is set, thus determining whether or not oscillator circuit 67 is correctly operating. If FF 131 is set, oscillator circuit 67 is regarded as being correctly functioning. If FF 131 has not been set, oscillator circuit 67 is considered to be malfunctioning. When circuit 67 is correctly operating, CPU 28 supplies a "0" signal, as the clock select signal SEL, to the data input terminal D of FF 77, thus resetting FF 77. The reset output of FF 77, i.e., an "1" signal, is supplied to the data input terminal D of FF 74, thereby setting FF 74. The set output of FF 74 opens NAND gate 75. As a result, the high-frequency (1 MHz) clock signal output by oscillator circuit 67 is output to CPU 28 via inverts 72 and 73, NAND gates 75 and 80, inverter 85, and NAND gate 86. Thus, when the clock select signal SEL is a "0" signal, the clock signal is switched from the low-frequency one to the high-frequency one when FF 74 is set. In this case, CPU 28 is operated in synchronism with the high-frequency clock signal, and calculate a transaction code.

After calculating the transaction code, CPU 28 supplies a "1" signal, as the clock select signal SEL, to the input data terminal D of FF 77, thus setting FF 77. The set output of FF 77, i.e., the "1" signal, is supplied to NAND gate 79. The "1" signal opens NAND gate 79. Therefore, the low-frequency (32.768 KHz) clock signal output by calendar circuit 33 is supplied to CPU 28 via inverter 78, NAND gates 79 and 80, inverter 85, and NAND gate 86. As a result, CPU 28 operates in synchronism with the low-frequency clock signal output by NAND gate 86. In this case, CPU 28 supplies the stop signal to AND gate 132, thereby closing this AND gate. Consequently, oscillator circuit 67 is disabled, and stops oscillating the high-frequency (1 MHz) clock signal.

When CPU 28 determines that oscillator circuit 67 is malfunctioning, CPU 28 supplies the stop signal to AND 132, while supplying the clock select signal SEL at the "1" level to the data input terminal D of FF 77. Hence, oscillator circuit 67 is disabled, while FF 86 keeps on outputting the low-frequency clock signal. The low-frequency clock signal is supplied to CPU 28, and CPU 28 operates in synchronism with the low-frequency clock signal to calculate a transaction code.

Figure 14:
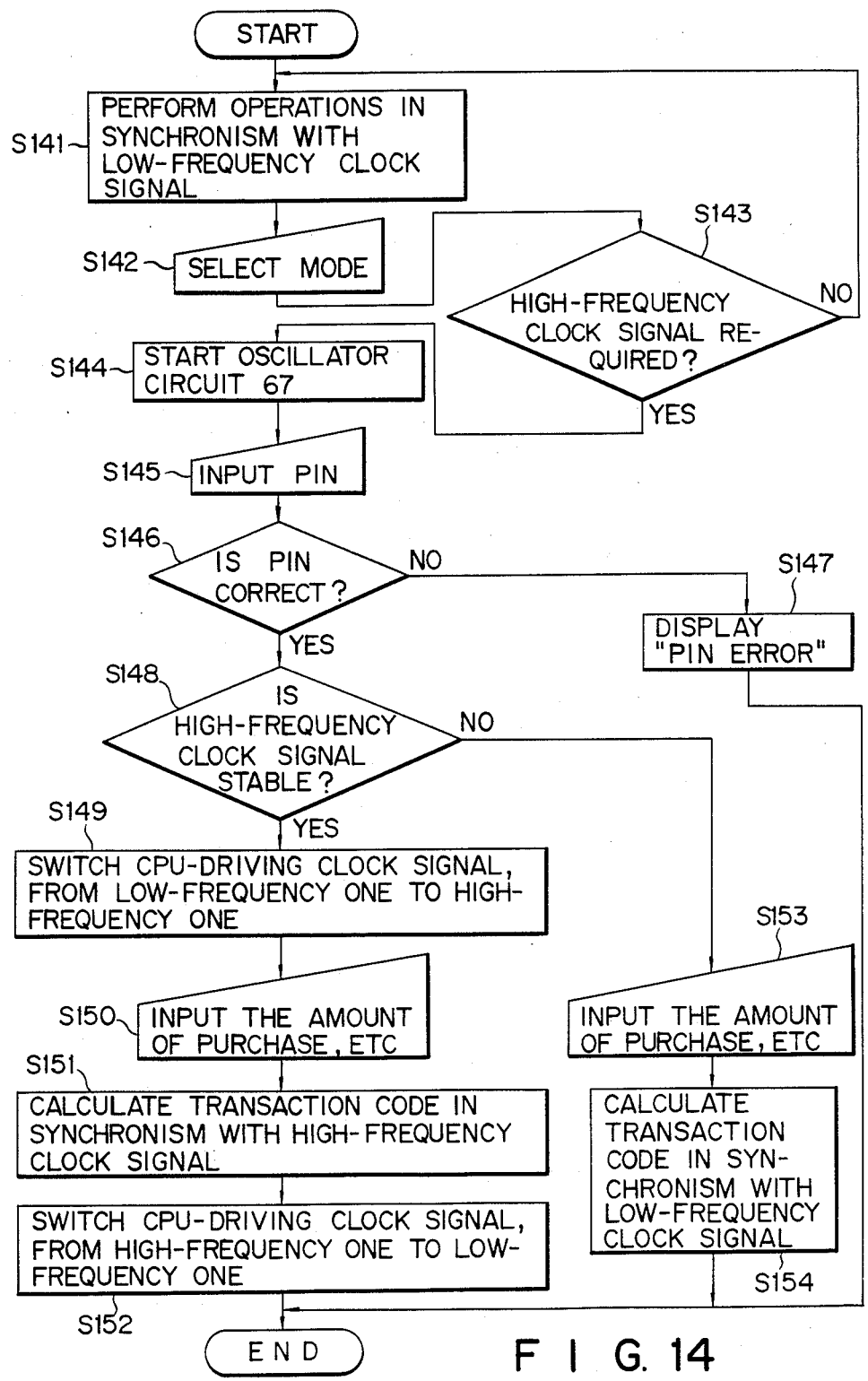
FIG. 14 shows a flowchart useful for explaining an off-line operation according to another embodiment of this invention.

The operation of IC card 10 using clock controller 62' shown in FIG. 13 will now be explained, with reference to the flow chart of FIG. 14.

As has been described, usually IC card 10 is set in the time display mode, and CPU 28 is halted. Unless IC card 10 is set to the on-line mode, and the POWER-ON key 12h (i.e., the equal key) is pushed, IC card 10 cannot be externally controlled.

When POWER-ON key 12h (i.e., the equal key) is pushed, keyboard interface 38 outputs a key-input interrupt signal to clock controller 62'. Clock controller 62' supplies the low-frequency clock signal to CPU 28, whereby CPU 28 is released from the halted condition. Hence, CPU 28 starts operating in synchronism with this low-frequency clock signal, and performs various operations, in step S141. More specifically, CPU 28 reads the time data representing the second, the minute, and the hour, from counters 97 to 101 of calendar circuit 33, and also reads the data representing the year, the month, and the day of the week, from data memory 31. Then, CPU 28 changes the format of these data items to a designated one, and outputs the data items set in the designated format to display controller 35. Display controller 35 converts these data items into character patterns, by using a character generator (not shown) incorporated in it. The character patterns are supplied to display driver 36. In accordance with the character patterns, display driver 36 drives display section 13. Hence, the display the date and time, which are used as operation guidance. CPU 28 waits for any key-input signal supplied from keyboard 12.

When CPU 28 is started, battery checker 24 is operated to determine whether or not the output voltage of built-in battery 25 is less than a predetermined threshold value. If the output voltage of battery 25 is less than the threshold value, CPU 28 causes display section 13 to display a message "Call Bank," and the off-line use of IC card 10 is prohibited thereafter.

When any mode key 12a is pushed while display section 13 is displaying the date and the time, IC card 10 is set to the desired mode, in step S142. In step S143, CPU 28 determines whether or not the high-frequency clock signal is required in the desired mode. If NO, the operation returns to step S141, and CPU 28 operates in synchronism with the low-frequency clock signal.

If YES in step S143, because IC card 10 has been set in the purchase mode, CPU 28 causes oscillator circuit 67 incorporated in clock controller 26' to start outputting the high-frequency clock signal, in step S144. At the same time, CPU 28 causes display section 13 to display a message showing that IC card 10 has been accepted, and also a message requesting that the card user should input his or her PIN (Personal Identification Number). In step S145, the card user operates keyboard section 12, thereby inputting his or her PIN. Then, CPU 28 determines, in step S146, whether or not PIN thus input is correct. If YES, the operation goes to step S148.

If NO in step S146, the message "PIN Error" is displayed by display section 13. Then, the card user operates keyboard 12 for the second time, thereby inputting the PIN. Step S146 is repeated. If NO again, the message "PIN Error" is again displayed by display section 13. Then, the user operates keyboard 12 for the third time, thus inputting the PIN. If CPU 28 determines that this PIN is not correct, the message "PIN Error" is displayed for the third time. Then, IC card 10 can no longer used in the purchase mode until. This measure is taken, thereby improving the security of IC card 10.

If YES in step 146, that is, if the input PIN is correct, CPU 28 causes display section 13 to display a message requesting that the card user input the amount of the purchase he or she has made. Then, in step S148, CPU 28 determines whether the high-frequency clock signal generated within clock controller 26' is stable or not. If YES, CPU 28 outputs a "0" signal as the clock select signal SEL. As a result, clock controller 26' stops supplying the low-frequency (32.768 KHz) clock signal, and starts supplying the high-frequency (1 MHz) clock signal to CPU 28, in step S149.

In the next step, S150, the card user pushes ten keys 12b, thereby inputting the amount of the purchase, in accordance with the message displayed by display section 13. In step S151, CPU 28 outputs a transaction code in the form of a random number. This transaction code and the amount of purchase are alternately displayed by display section 13. Then, CPU 28 supplies a "1" signal, as the clock select signal SEL, to clock controller 26', whereby controller 26' stops supplying the high-frequency (1 MHz) clock signal, and starts supplying the low-frequency (32.768 KHz) clock signal to CPU 28, in step S152.

If NO in step S148, that is, if CPU 28 determines that the high-frequency clock signal is not stable, clock controller 26' continues to supply the the low-frequency clock signal to CPU 28. Then, in step S153, the card user pushes ten keys 12b, thereby inputting the amount of the purchase, in accordance with the message displayed by display section 13. Therefore, CPU 28 outputs a transaction code in the form of a random number in step S154. This code and the amount of purchase are alternately displayed by display section 13.

After confirming the amount of purchase which is displayed by display section 13, and also confirming the transaction code which CPU 28 has calculated in synchronism with the high-frequency clock signal or the low-frequency clock signal and which is displayed by display section, the card user hands over IC card 10 to the shop clerk. The shop clerk inserts IC card 10 into a terminal device (not shown) which has a magnetic stripe reader, and then pushes YES key 12h (i.e., the equal key). Then, CPU 28 controls controller 40, whereby magnetism generating members 14a and 14b output data similar to the data magnetically read from a magnetic stripe of the ordinary credit card. The magnetic head of the magnetic stripe reader reads, whereby the transaction is completed.

When the user uses IC card 10 in a shop where no card terminal device is installed, the shop clerk takes note of the transaction code, or imprint the characters embossed on card 10 onto a sales slip of a specific form.

Now, the on-line function of IC card 10 will be described. When the card user inserts IC card 10 into IC card read/write unit 16 through slot 17 cut in the housing of unit 16, contact section 11 of IC card 10 is connected to the contact section (not shown) of unit 16. Then, the power-supply voltage signal is supplied from unit 16 via section 11 to power controller 23, and the reset signal is supplied from unit 13 to reset controller 22, as is shown in FIG. 3. Power controller 23 checks the power-supply voltage, and disconnects builtin battery 25 from battery checker 24, so that IC card 10 is driven by only the externally applied power-supply voltage. In response to the reset signal, reset controller 22 generates a reset signal, which drives CPU 28. In this case, CPU 28 operates in synchronism with the clock signal output by IC card read/write unit 16.

At the end of the duration of the reset signal supplied from unit 16, CPU 28 starts executing the program stored in program ROM 29, executing the 0th address of program ROM29 first. More specifically, CPU 28 checks the condition of the externally applied voltage. If no drop of the externally applied voltage is detected, CPU 28 executes the program of the on-line mode. More precisely, the protocol data stored within IC card 10 is transferred to IC card read/write unit 16, and then waits for instructions coming from unit 16. Once unit 16 has received a correct I/O signal from IC card 10, it demands that data be transferred to it from IC card 10, that data be rewritten in IC card 10, or that new data be written into IC card 10, in accordance with the application program stored in unit 16. IC card 10 stops operating in the on-line mode when unit 16 stops supplying the power-supply voltage to IC card 10, or when IC card 10 is drawn from unit 16.

As has been described, when IC card 10 is used in the off-line mode, such as the purchase mode, the clock signal for driving CPU 28 is switched, form the low-frequency one to the high-frequency one in order that CPU 28 generates a transaction code, and then from the high-frequency one to the low-frequency one. That is, two clock signals of different frequencies are used to drive CPU 28, the high-frequency one being supplied to CPU 28 to start the CPU or to operate the CPU at high speed. Thus, CPU 28 can quickly come into operation and perform operations at high speed, whereby the internally supplied power can be saved.

Since the high-frequency clock signal is stabilized by the use of the low-frequency clock signal, while an operation guidance is being displayed or while CPU 28 is receiving a key-input signal, the high-frequency clock signal is sufficiently stable whenever it must be supplied to CPU 28. Further, since the CPU-driving clock signal is switched, from the low-frequency clock signal to the high-frequency one, after the high-frequency clock signal has been sufficiently stabilized, there is no possibility that the circuitry of IC card 10 is locked. If the high-frequency clock signal is not sufficiently stable, the low-frequency clock signal is continued to be used, thus preventing the locking of the circuitry of IC card 10.

The embodiments described above are IC cards. Nonetheless, the present invention is not limited to IC cards. The invention can be applied to any portable medium which includes a data memory and a control element. The portable medium according to the invention need not be shaped like a card; it can be shaped like a rod.

What is claimed is:

1. A portable medium having a control element which controls a data memory, comprising:
   input means for inputting various instructions for causing said control element to perform various operations;
   first clock means for generating a clock signal of a first frequency;
   second clock means for generating a clock signal of a second frequency which is higher than that of the first frequency; and
   clock control means for causing said second clock means to start generating the clock signal, in response to an instruction supplied from said input means, for supplying the clock signal of the first frequency generated by said first clock means to said control element, and, when the next instruction is supplied from said input means, for supplying the clock signal of the second frequency generated by said second clock means to said control element.

2. The portable medium according to claim 1, wherein said control element includes a CPU, and said clock control means supplies either the clock signal of the first frequency or the clock signal of the second frequency, as a driving clock signal, to the CPU.

3. The portable medium according to claim 1, further comprising timepiece means for counting the pulses which form the clock signal of the first frequency, thereby measuring time.

4. The portable medium according to claim 1, wherein the instruction supplied from said input means for starting said control element has an instruction which enables the portable medium to operate by itself.

5. The portable medium according to claim 1, wherein said clock control means supplies the clock signal of the second frequency to said control element when said next instruction supplied from said input means is a specified instruction.

6. The portable medium according to claim 5, wherein said specified instruction causes said control element to perform operations at a high speed.

7. The portable medium according to claim 6, wherein said specified instruction causes said control element to perform calculations.

8. The portable medium according to claim 5, wherein said control element includes a CPU, and said clock control means supplies either the clock signal of the first frequency or the clock signal of the second frequency, as a driving clock signal, to the CPU.

9. The portable medium according to claim 5, further comprising timepiece means for counting the pulses which form the clock signal of the first frequency, thereby measuring time.

10. The portable medium according to claim 5, wherein the instruction supplied from said input means for starting said control element has an instruction which enables the portable medium to operate by itself.

11. The portable medium according to claim 1, further comprising detecting means for determining that the clock signal of the second frequency is correctly generated by said second clock means, and wherein said clock control means supplies the clock signal of the second frequency to said control element in response to the next instruction supplied from said input means, provided that said detecting means determines that the clock signal of the second frequency is generated correctly.

12. The portable medium according to claim 11, wherein said detecting means counts the pulses which form the clock signal of the second frequency generated by said second clock means, and, when the number of the pulses counted exceeds a predetermined value, it is determined that this clock signal is a correct one.

13. The portable medium according to claim 11, wherein said control element includes a CPU, and said clock control means supplies either the clock signal of the first frequency or the clock signal of the second frequency, as a driving clock signal, to the CPU.

14. The portable medium according to claim 11, further comprising timepiece means for counting the pulses which form the clock signals of the first frequency, thereby measuring time.

15. The portable medium according to claim 11, wherein the instruction supplied from said input means for starting said control element has an instruction which enables the portable medium to operate by itself.

16. The portable medium according to claim 11, wherein said clock control means supplies the clock signal of the second frequency to said control element when said next instruction supplied from said input means is a specified instruction.

17. The portable medium according to claim 16, wherein said specified instruction causes said control element to perform operations at a high speed.

18. The portable medium according to claim 17, wherein said specified instruction causes said control element to perform calculations.

19. A portable medium having a control element which controls a data memory, comprising:
first clock means for always generating a clock signal of a first frequency;
second clock means for generating a clock signal of a second frequency which is higher than that of the first frequency;
clock control means for switching a clock signal which drives said control element, from the clock signal of the first frequency generated by said first clock means to the clock signal of the second frequency generated by said second clock means to said control element;
detecting means for determining that the clock signal of the second frequency is correctly generated by said second clock means, before said clock control means switches the clock signal; and
means for causing said clock control means to switch the clock signal when said detecting means determines that the clock signal of the second frequency is correctly generated by said second clock means.

20. The portable medium according to claim 19, wherein said detecting means counts the pulses which form the clock signal of the second frequency generated by said second clock means, and, when the number of the pulses counted exceeds a predetermined value, it is determined that this clock signal is a correct one.

21. A portable medium having a control element which controls a data memory, comprising:
input means for inputting various instructions for causing said control element to perform various operations;
first clock means for generating a clock signal of a first frequency;
second clock means for generating a clock signal of a second frequency which is higher than that of the first frequency; and
clock control means for causing said second clock means to start generating the clock signal, in response to an instruction supplied from said input means and for supplying the clock signal of the second frequency generated by said second clock means to said control element.

* * * * *